United States Patent [19]

Stolz et al.

[11] 3,838,288

[45] Sept. 24, 1974

[54] METHOD FOR THE REMELT TREATMENT OF WORKPIECES AND THE LIKE

[75] Inventors: Heinz Stolz, Otterfing; Johannes Koy, Germering, both of Germany

[73] Assignee: Steigewald Strahltechnik G.m.b.H., Munich, Germany

[22] Filed: Feb. 22, 1973

[21] Appl. No.: 334,775

[30] Foreign Application Priority Data

Feb. 26, 1972 Germany.............................. 2209147

[52] U.S. Cl............ 250/492, 148/13 R, 219/121 EB
[51] Int. Cl.............................................. H01j 37/00
[58] Field of Search............... 250/492; 219/121 EE; 148/13 R

[56] References Cited
UNITED STATES PATENTS

| 2,968,723 | 1/1961 | Steigerwald | 148/13 R |
| 3,388,618 | 6/1968 | Evancic | 76/101 |
| 3,505,126 | 4/1970 | Antes | 148/13 R |

*Primary Examiner*—Archie R. Borchelt
*Assistant Examiner*—C. E. Church
*Attorney, Agent, or Firm*—Nichol M. Sandoe

[57] ABSTRACT

A method for the remelt treatment of workpieces, machine parts and the like comprises the application of energy by means of a controlled energy beam to the remelt region in two successive steps to avoid formation of pores. In the first remelting step, the material within the remelt region is melted and allowed to solidify, and is then again remelted in a second step in which the impingement of energy is controlled to remelt only the region of material previously remelted and solidified.

8 Claims, No Drawings

METHOD FOR THE REMELT TREATMENT OF WORKPIECES AND THE LIKE

This invention relates to a method for the remelt treatment of workpieces, machine parts or the like by means of an energy beam. By "energy beam" there is to be understood a beam which can be influenced and controlled by known beam-optical means as, for example, an electron beam or a laser beam.

It has been discovered that in the remelt treatment of workpieces, machine parts or the like by means of an energy beam, for example, an electron beam, in which changes in structure are produced at selected predetermined regions of the material by remelting and cooling which take place at controlled speeds, pores may result within these remelted regions or within the corresponding volumes of material. Such phenomena have been known to occur, for example, upon the remelt treatment by an electron beam of workpieces or the like made of cast iron. In this connection, it has also been found that the formation of pores cannot be avoided even by lengthening the time during which the treated regions of material are subjected to the energy.

An object of the present invention is, therefore, to provide a new and improved method by which the formation of pores can be prevented within those regions of material which have been remelted by energy beams applied to workpieces or the like.

Another object of the invention is to provide a method of subjecting workpieces, machine parts, construction parts and the like consisting of cast materials to a remelt treatment by means of an energy beam.

Still another object of the invention is to provide a method of subjecting structural parts of rotary piston engines to a remelt treatment by a beam of energy.

Another object of the invention is to provide a method of subjecting valve seats on cylinder heads of internal combustion engines to a remelt treatment by means of an energy beam.

According to the method of the present invention, the remelt treatment of workpieces, machine parts or the like by an energy beam is effected in two successive remelting steps in such manner that the region of the material of the workpiece or the like which is locally remelted in the first step is again remelted after it has solidified. In the second remelting step, the impingement of the energy of the energy beam is so controlled that it is at most sufficient again only to remelt the region of material which has been remelted in the first step and thereafter solidified.

As has been conclusively shown by examinations of workpieces or the like which have been treated by the method of the invention, it is possible in this way to obtain changes in structure which are entirely free of pores within the treated regions of the material or within the corresponding volumes of material.

The application of energy by the energy beam in the second remelting step is preferably controlled in such a manner as to just fail to reach the perimeters of the region of material melted in the first remelting step. Thereby, it is assured that material directly adjoining the region of material which has already been remelted in the first step will not also be remelted.

In accordance with a further development of the invention, the application of energy by the energy beam during the second remelting step may be controlled as a function of the temperature of the resolidified region of material or corresponding volume of material which has previously been remelted in the first step.

Furthermore, within the scope of the invention, there are also the two possibilities that the second remelting step is carried out either immediately after solidification of the treated region of material or the corresponding volume of material which has been remelted in the first step, or within a given period of delay after solidification.

The method of the invention can preferably be carried out by the use of an electron beam as energy beam. The special properties of an electron beam, and particularly the possibility of controlling it practically without inertia, and the possibilities afforded by it for precisely determining the quantity and location of the impingement of energy can be considered known, so that it is unnecessary to described them here in detail.

What is claimed is

1. A method for the remelt treatment of selected surface regions of workpieces by means of a controllable beam of radiant energy which comprises as a first step applying the beam thereto to remelt the material within the said surface regions, allowing the remelted material to solidify, and then as a second step again applying the beam thereto to remelt again the said previously solidified material within the said surface regions while controlling the impingement of said radiant energy to remelt again only said previously remelted and solidified material within the said surface regions to thereby prevent the formation of pores within the treated regions of the material.

2. The method according to claim 1 in which the impingement of said radiant energy applied by said beam to remelt again said previously melted and solidified material is controlled to fail to reach the perimeters of the previously remelted material within said surface regions.

3. The method according to claim 1 in which the application of said radiant energy by the beam during said second step is controlled as a function of the temperature of said previously solidifed material within said surface regions.

4. The method according to claim 1 in which the second remelting step is carried out immediately after solidification of the material remelted by said first step.

5. The method according to claim 1 in which the second remelting step is carried out within a given period of delay after solidification of the material remelted by said first step.

6. The method according to claim 1 in which the material treated is cast iron.

7. The method according to claim 1 in which the articles treated are structural parts of a rotary piston engine.

8. The method according to claim 1 in which the articles treated are valve seats of the cylinder heads of internal combustion engines.

* * * * *